US011199669B1

(12) United States Patent
Leigh et al.

(10) Patent No.: US 11,199,669 B1
(45) Date of Patent: Dec. 14, 2021

(54) MODULAR FACEPLATE OPTICAL SUB-ASSEMBLY

(71) Applicant: HEWLETT PACKARD ENTERPRISE DEVELOPMENT LP, Houston, TX (US)

(72) Inventors: Kevin B. Leigh, Cypress, TX (US); Everett Salinas, Pasadena, TX (US); Kuang-Yi Wu, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/031,428

(22) Filed: Sep. 24, 2020

(51) Int. Cl.
H04B 10/00 (2013.01)
G02B 6/42 (2006.01)

(52) U.S. Cl.
CPC ......... G02B 6/4257 (2013.01); G02B 6/4245 (2013.01); G02B 6/4277 (2013.01)

(58) Field of Classification Search
CPC combination set(s) only.
See application file for complete search history.

(56) References Cited

U.S. PATENT DOCUMENTS

| 5,121,454 | A | * | 6/1992 | Iwano | G02B 6/3807 385/56 |
| 5,542,015 | A | * | 7/1996 | Hultermans | G02B 6/3869 385/60 |
| 6,331,079 | B1 | * | 12/2001 | Grois | G02B 6/3821 385/53 |
| 6,361,218 | B1 | * | 3/2002 | Matasek | G02B 6/3821 385/60 |
| 6,402,393 | B1 | * | 6/2002 | Grimes | G02B 6/3897 385/56 |
| 6,406,192 | B1 | * | 6/2002 | Chen | H01R 13/6315 385/56 |
| 6,878,872 | B2 | * | 4/2005 | Lloyd | G02B 6/4277 174/384 |

(Continued)

FOREIGN PATENT DOCUMENTS

JP 2009253177 10/2009

OTHER PUBLICATIONS

EMI Catalog, (Research Paper), EMI Essentials—Laird Technologies, 2012, 117 Pgs.

Primary Examiner — Agustin Bello
(74) Attorney, Agent, or Firm — Nolte Lackenbach Siegel

(57) ABSTRACT

A faceplate optical sub-assembly is provided for accommodating a plurality of optical receptacles mounted in a faceplate of a computing device. The faceplate optical sub-assembly accommodates one or more optical receptacle housings having optically-connected front and rear optical bays. A collar having a single aperture surrounds the one or more optical bays, and a shell structure comprised of a pair of interlocking sub-shells engages on the rear of the collar. A gasket is disposed between the collar and the shell structure. The collar, gasket, and shell structure provide electromagnetic interference (EMI) shielding for optical connections made between optical fibers inserted in the front and rear optical bays, and rigidly engage the plurality of optical receptacle housings. The single aperture of the collar and the multi-part shell structure allows for insertion of a fiber jumper assembly into the rear bays of the faceplate optical sub-assembly prior to insertion into a faceplate of a computing device.

20 Claims, 14 Drawing Sheets

(56) References Cited

U.S. PATENT DOCUMENTS

| | | | | |
|---|---|---|---|---|
| 6,932,514 B2* | 8/2005 | Anderson | ............ | G02B 6/3825 385/56 |
| 6,943,287 B2* | 9/2005 | Lloyd | ............... | H01R 13/6594 174/359 |
| 7,037,136 B1* | 5/2006 | Korsunsky | ......... | H01R 13/6594 439/607.07 |
| 7,144,163 B2* | 12/2006 | Tanaka | ................ | G02B 6/3825 385/75 |
| 7,195,404 B1* | 3/2007 | Dudley | ............... | G02B 6/4201 385/92 |
| 7,229,221 B2* | 6/2007 | Ahrens | ............... | G02B 6/4246 385/92 |
| 7,357,582 B2 | 4/2008 | Oki et al. | | |
| 7,419,309 B2* | 9/2008 | Faika | ................. | G02B 6/3897 385/53 |
| 7,438,564 B2* | 10/2008 | Lloyd | ................. | G02B 6/4277 174/354 |
| 7,717,625 B2* | 5/2010 | Margolin | ............ | G02B 6/3825 385/71 |
| 7,729,130 B1* | 6/2010 | Bianchini | ............ | H05K 9/006 361/816 |
| 7,794,157 B2 | 9/2010 | Hudgins et al. | | |
| 8,454,382 B2* | 6/2013 | Zhang | ............... | H01R 13/6587 439/540.1 |
| 8,622,770 B2* | 1/2014 | Teo | ..................... | H05K 9/0058 439/607.2 |
| 8,911,256 B2* | 12/2014 | Qiao | ................. | H01R 13/6581 439/607.18 |
| 9,039,300 B2* | 5/2015 | Kondo | ................ | G02B 6/4256 385/92 |
| 9,039,301 B2 | 5/2015 | Kawase et al. | | |
| 9,086,546 B2* | 7/2015 | Jones | ................ | G02B 6/3825 |
| 9,287,640 B2* | 3/2016 | Hirschy | .............. | H01R 12/585 |
| 9,402,332 B2* | 7/2016 | McKervey | ......... | H05K 7/20409 |
| 9,494,746 B2* | 11/2016 | Sanders | ............ | G02B 6/3849 |
| 9,532,490 B2* | 12/2016 | Bandhu | .............. | H05K 9/0015 |
| 9,615,492 B2* | 4/2017 | Brodsky | ............. | H05K 9/0015 |
| 9,666,995 B1* | 5/2017 | Phillips | ............... | G02B 6/4277 |
| 9,735,481 B2* | 8/2017 | Costello | ............... | H01R 13/74 |
| 9,874,702 B2* | 1/2018 | Megason | ............ | G02B 6/3825 |
| 10,001,605 B2* | 6/2018 | Gurreri | ............... | G02B 6/3825 |
| 10,564,364 B2* | 2/2020 | Waldron | ............. | G02B 6/3893 |
| 10,571,984 B2* | 2/2020 | Panella | .................. | H04L 25/02 |
| 10,772,237 B2* | 9/2020 | Regnier | ............. | H01R 13/6335 |
| 2002/0025720 A1* | 2/2002 | Bright | ................. | H05K 9/0058 439/541.5 |
| 2003/0152339 A1 | 8/2003 | Dairetal | | |
| 2003/0169581 A1* | 9/2003 | Bright | ................. | H05K 9/0015 361/816 |
| 2004/0027818 A1* | 2/2004 | Rathnam | ............ | G02B 6/4277 361/816 |
| 2005/0018978 A1* | 1/2005 | Nevo | .................. | G02B 6/4246 385/92 |
| 2005/0255726 A1* | 11/2005 | Long | .................. | H01R 13/6587 439/80 |
| 2005/0281509 A1* | 12/2005 | Cox | ..................... | G02B 6/3849 385/59 |
| 2006/0003632 A1* | 1/2006 | Long | .................... | H01R 13/659 439/607.2 |
| 2006/0140552 A1* | 6/2006 | Mizue | ................. | G02B 6/4261 385/92 |
| 2007/0128936 A1* | 6/2007 | Long | .................... | H05K 9/0058 439/607.28 |
| 2007/0128937 A1* | 6/2007 | Long | .................. | H01R 13/6594 439/607.01 |
| 2007/0212942 A1* | 9/2007 | Long | .................... | G02B 6/4277 439/607.17 |
| 2008/0047746 A1* | 2/2008 | Chen | .................... | H05K 9/0058 174/369 |
| 2008/0285236 A1* | 11/2008 | Phillips | .............. | H01R 13/6582 361/709 |
| 2008/0315528 A1* | 12/2008 | Moore | ................ | H05K 9/0058 277/314 |
| 2010/0151733 A1* | 6/2010 | Tsou | .................. | H01R 13/6594 439/607.55 |
| 2011/0223805 A1* | 9/2011 | Regnier | ............... | H01R 13/506 439/607.01 |
| 2013/0072063 A1* | 3/2013 | Qiao | .................. | H01R 13/6584 439/607.01 |
| 2013/0164970 A1* | 6/2013 | Regnier | ............. | H05K 7/20509 439/487 |
| 2014/0196943 A1* | 7/2014 | Hirschy | ............. | G02B 6/4246 174/382 |
| 2016/0149324 A1* | 5/2016 | Regnier | ............... | H01R 43/205 439/76.1 |
| 2016/0161680 A1* | 6/2016 | Nguyen | ................ | G02B 6/3879 385/59 |
| 2016/0359278 A1* | 12/2016 | Kachlic | ............... | H01R 12/737 |
| 2019/0146167 A1* | 5/2019 | Leigh | .................. | G02B 6/4246 361/715 |
| 2021/0132311 A1* | 5/2021 | Shearman | ............ | G02B 6/4292 |

* cited by examiner

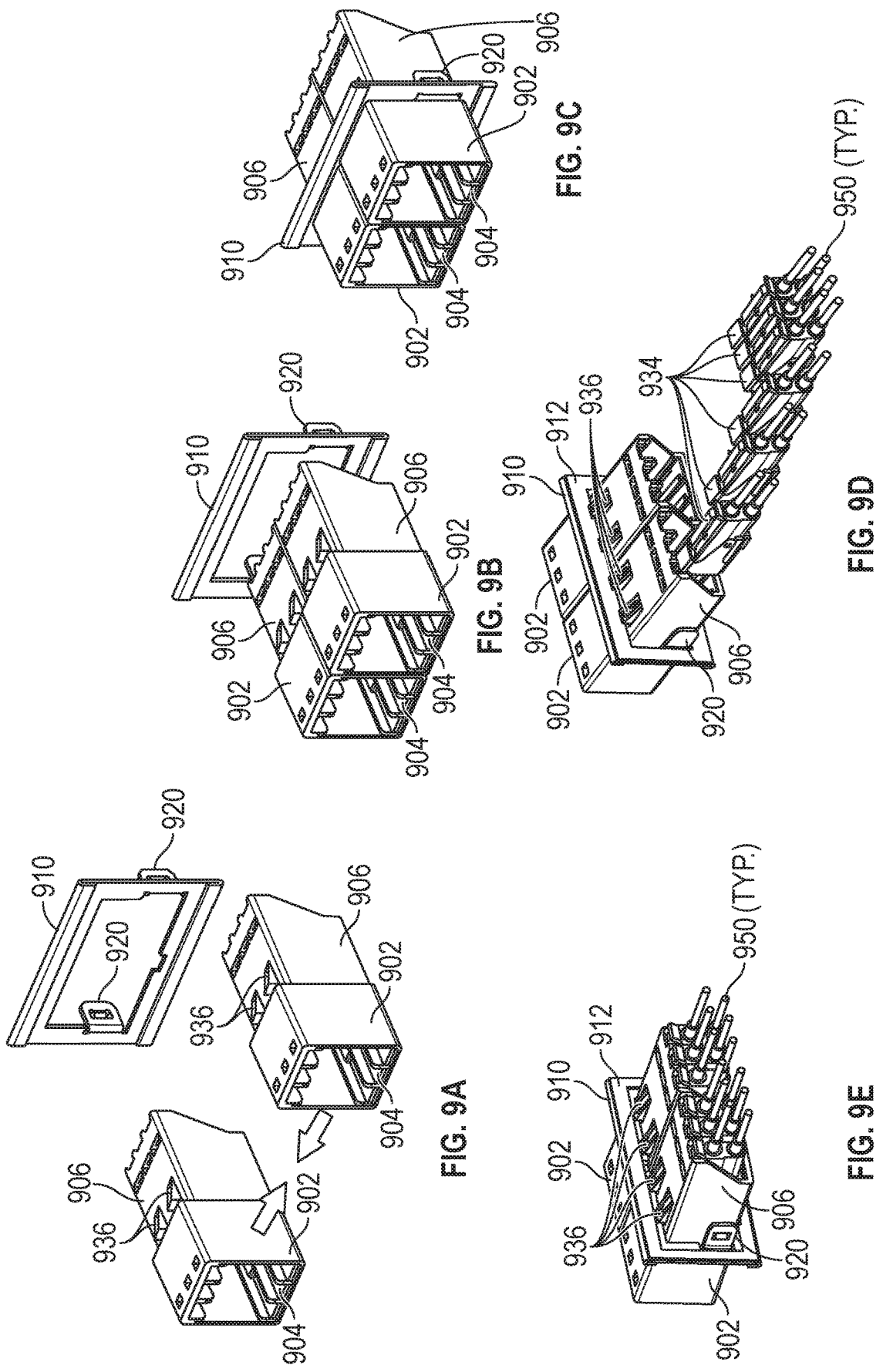

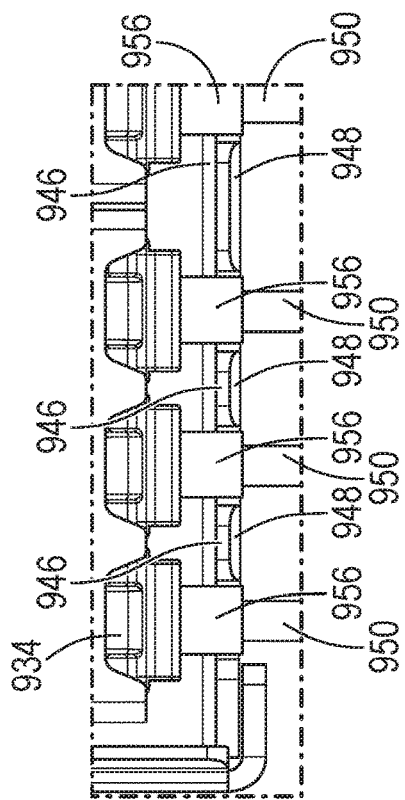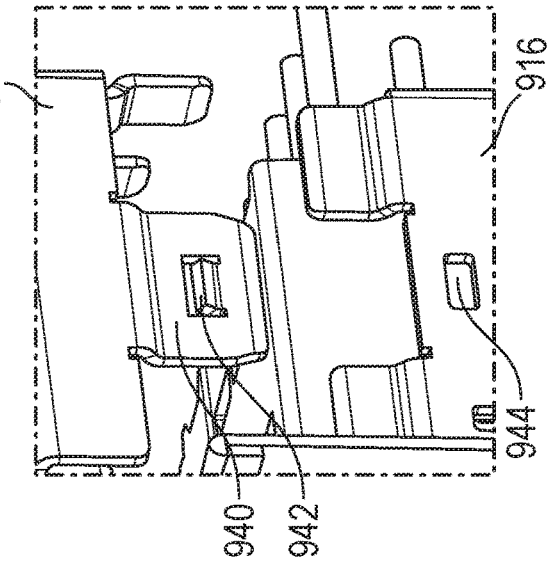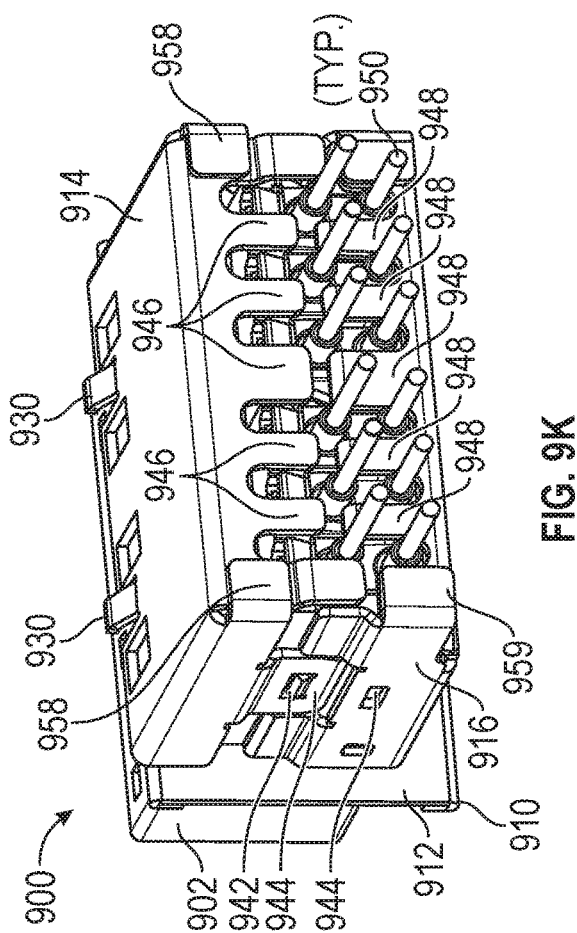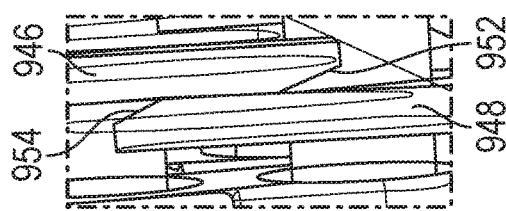
FIG. 9L
FIG. 9N
FIG. 9K
FIG. 9M

MODULAR FACEPLATE OPTICAL SUB-ASSEMBLY

BACKGROUND

Computing systems may include a number of compute modules and other components (memory units, data routers, and the like) which may be interconnected with fiberoptic cables carrying high-bandwidth digital signals. Some compute modules and system components, such as rack-mounted compute modules in computing and data centers, may be interconnected with multiple external fiberoptic cables connected through the compute modules' faceplates. Within a compute module, externally-connected fiberoptic cables may be connected to internal computing circuitry for processing data carried on the fiberoptic cables.

BRIEF DESCRIPTION OF THE DRAWINGS

The present disclosure is best understood from the following detailed description when read with the accompanying figures, wherein.

Figure 1:
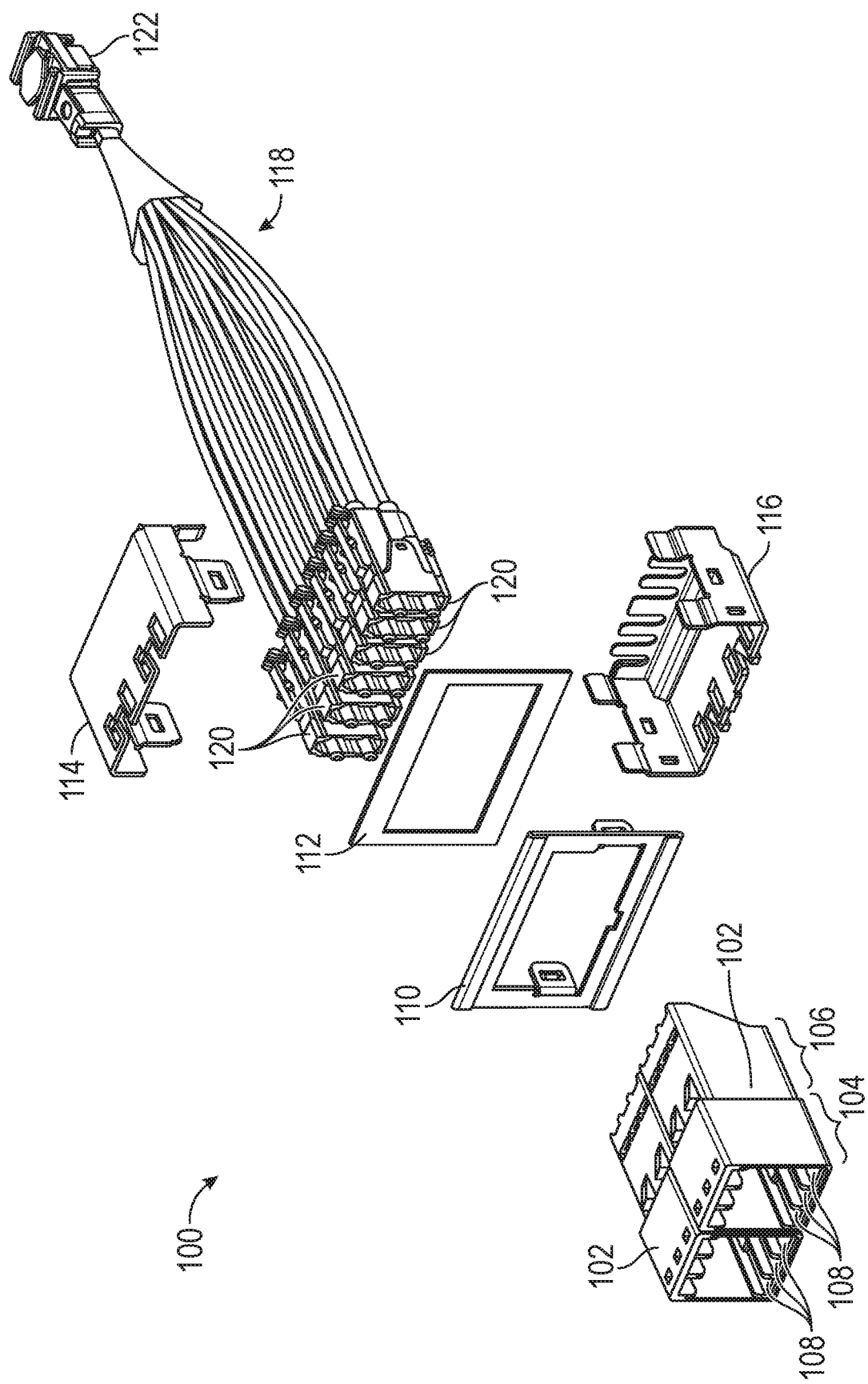
FIG. 1 is an exploded isometric view of an modular faceplate optical sub-assembly according to one example.

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

One consideration in the connection of fiberoptic cables to compute devices is to ensure appropriate shielding of electromagnetic interference (EMI) and/or radio-frequency interference (RFI) to prevent to high-speed electromagnetic signals from escaping or entering. In examples herein, shielding may be provided through the provision of EMI/RFI-shielding shell structures encasing the components of an optical sub-assembly.

Another consideration is the mechanical integrity of the fiberoptic cable connections to a compute module, which in various examples herein is achieved with modular components which rigidly and securely affix the optical sub-assembly to the faceplate of a compute device. In various examples herein, mechanical integrity may be achieved with a shell structure surrounding one or more multi-bay optical receptacles and engaging a faceplate of a compute module.

Yet another consideration in the coupling of fiberoptic cables to compute modules is the assembly process, which may involve insertion of connections of a fiber jumper to rear portions of one or more receptacles extending through a compute module faceplate. If receptacles are installed into a faceplate before connections are made to a fiber jumper, it may be more difficult to install the fiber jumper and arrange the fiber jumper within the confines of the compute module. In various examples herein, an arrangement is provided wherein connections of a fiber jumper may be installed to rear portions of one or more receptacles prior to installation of the receptacles into a faceplate of a compute module.

FIG. 1 is an exploded isometric view of a modular faceplate optical sub-assembly 100 for a compute module. In the example of FIG. 1, sub-assembly 100 includes a plurality of multi-bay optical housings 102 each having a front optical receptacle 104 and a rear optical receptacle 106. In the example of FIG. 1, each front optical receptacle 104 includes a plurality of front optical bays 108, which may be, for example, duplex connector bays for receiving two-fiber plug connectors. One example of such a connector is the MDC connector commercially available from USConec, Hickory N.C., USA. Such optical plug connectors and their receptacle bays are typically made of non-conductive materials (e.g., plastic), and therefore form a large orifice that allows electromagnetic signals to escape or enter, potentially causing interference (EMI) and/or radio-frequency interference (RFI). As noted, various examples herein address such EMI/RFI considerations.

The plurality of multi-bay optical housings 102 may be arranged in a horizontal row, i.e., two or more multi-bay optical housings are disposed side-by-side and inserted into and surrounded by a collar 110. Behind collar 110 may be a gasket 112, which in some examples may be made of conductive fabric over foam to provide shielding of EMI/RFI.

In the example of FIG. 1, sub-assembly 100 further includes a shell structure for further retaining the plurality of multi-bay optical housings 102. The shell structure comprises an upper sub-shell 114 and a lower sub-shell 116. In this example, and as herein after described in further detail, upper sub-shell 114 and lower sub-shell 116 may be interlocking and secured around rear optical receptacles 106 of the plurality of multi-bay optical housings 102.

As shown in FIG. 1, a fiber jumper 118 may include a plurality of optical fiber jumper plug connectors 120 for insertion into a plurality of rear optical bays (not visible in FIG. 1) in rear optical receptacles 106 of the plurality of multi-bay optical housings 102. Fiber jumper 118 may further include a chip ferrule 122 for interfacing with optical signal generating/receiving opto-electronics components disposed within an optical socket connector. The optical socket connector, in turn, may interface with circuitry in a compute module (not shown in FIG. 1) into which sub-assembly 100 may be installed.

Figure 2:
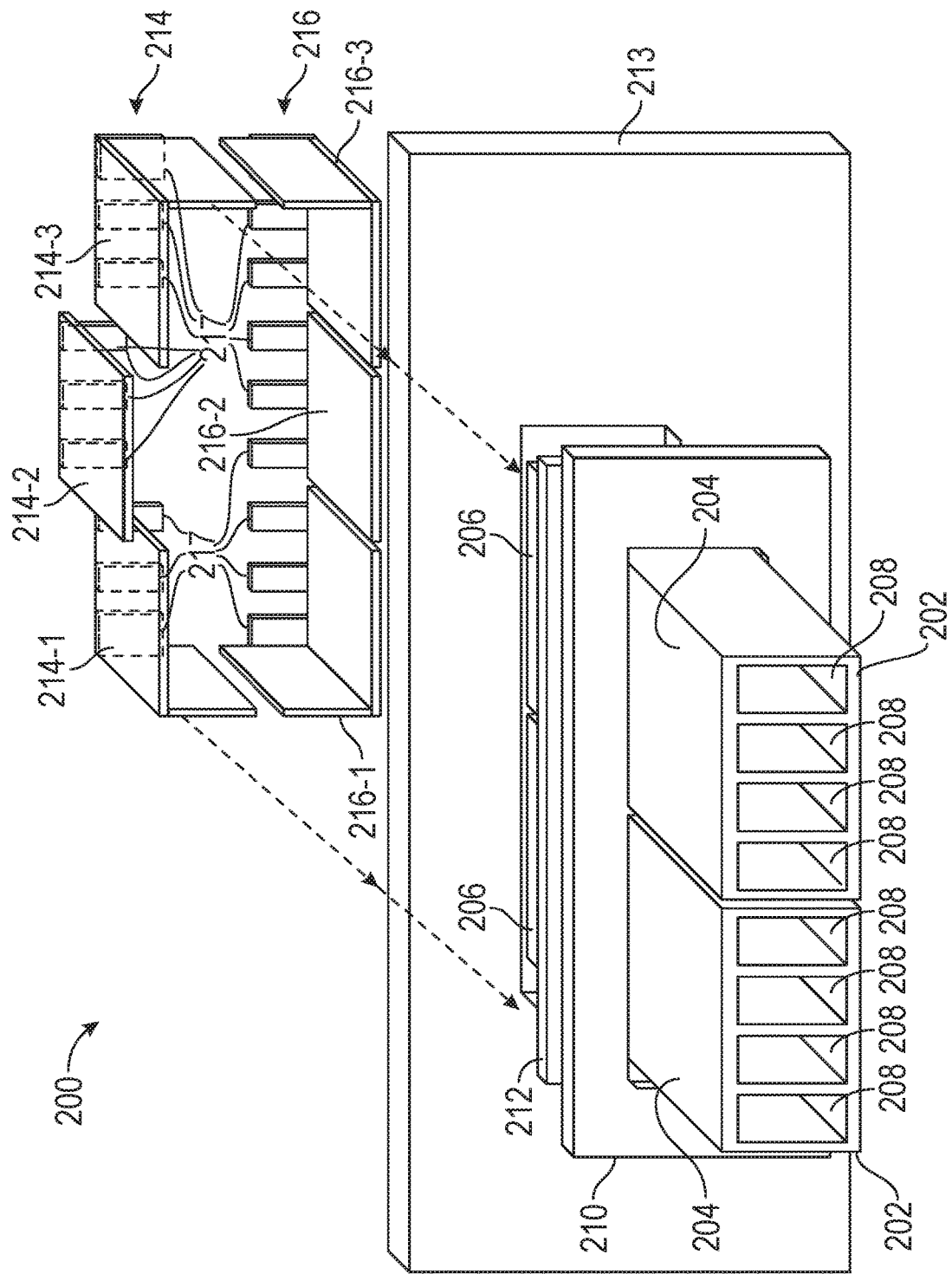
FIG. 2 is a partially exploded front isometric view of a modular faceplate optical sub-assembly according to one example.

FIG. 2 is a partially exploded front isometric view of a modular faceplate optical sub-assembly 200 according to one example. The example of FIG. 2 includes a plurality of multi-bay optical housings 202 arranged in a horizontal row and each having a front multi-bay optical connector receptacle 204. Each optical connector receptacle 204 may include a plurality of front optical bays 208, which may be duplex connector bays for receiving optical plug connectors. The plurality of multi-bay optical housings 202 may each have rear multi-bay optical receptacles 206. A collar 210 surrounds the plurality of multi-bay optical housings 202. A gasket 212 may be disposed between collar 210 and a compute module faceplate 213 of a compute module.

The example modular faceplate optical subassembly 200 of FIG. 2 further shows a shell structure including an upper sub-shell 214 and a lower sub-shell 216. In this example upper sub-shell 214 includes a plurality of elements 214-1, 214-2, and 214-3, which may interlock with one another. Lower sub-shell 216 includes a plurality of elements 216-1, 216-2, and 216-3 which may interlock with one another. Upper sub-shell 214 and lower sub-shell 216, in turn, may interlock with each other and engage with faceplate 213 after insertion into faceplate 213. The shell structure including upper sub-shell 214 and lower sub-shell 216 are secured around rear optical receptacles 206 of plurality 202 of multi-bay optical housings.

As shown in FIG. 2, the various sub-shell elements include a plurality of fingers 217 defining spaces therebetween to allow for passage of optical fibers therethrough, while providing additional EMI/RFI shielding from the overall shell structure.

Figure 3:
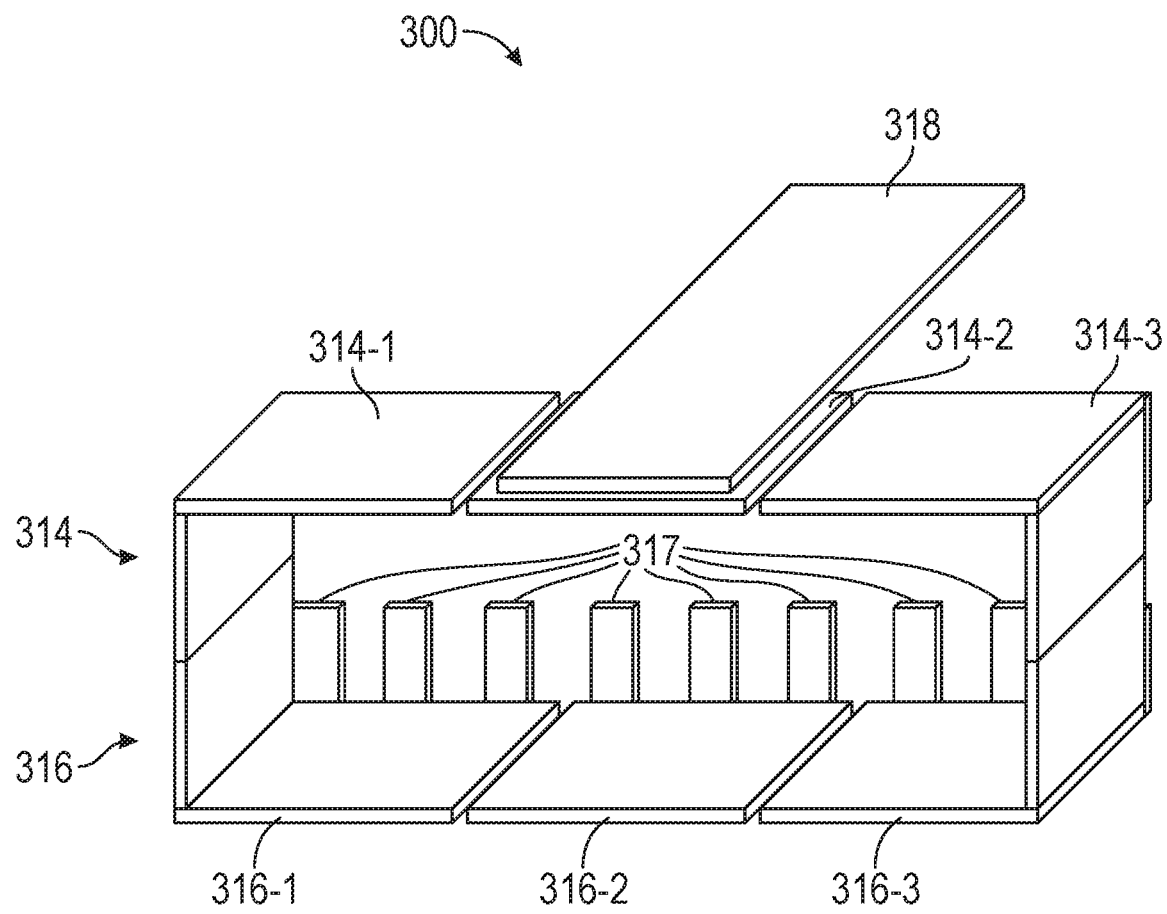
FIG. 3 is a front isometric view of interlocking sub-shells for a modular faceplate optical sub-assembly according to one example.

FIG. 3 is a front isometric view of another example of a shell structure 300 including interlocking sub-shells 314 and 316 of a modular faceplate optical sub-assembly. In the example of FIG. 3, upper interlocking sub-shell 314 includes a plurality of interlocking elements 314-1, 314-2, and 314-3, and lower sub-shell 316 includes a plurality of interlocking elements 316-1, 316-2, and 316-3. In some examples, shell structure 300 is mounted behind a faceplate (not shown in FIG. 3) of a compute device and encases rear portions of optical receptacles (also not shown in FIG. 3). The example of FIG. 3 further includes an upper sub-shell extension 318, atop interlocking element 314-2 of upper sub-shell 314 that may be used to manage organization of fibers interfacing to optical plug connectors installed in the rear optical receptacles 206 (described in FIG. 2). FIG. 3 further shows that bottom interlocking elements 316-1, 316-2, and 316-3 may include fingers 317 defining spaces therebetween for passage of optical cables, as described above with reference to FIG. 2.

Figure 4:
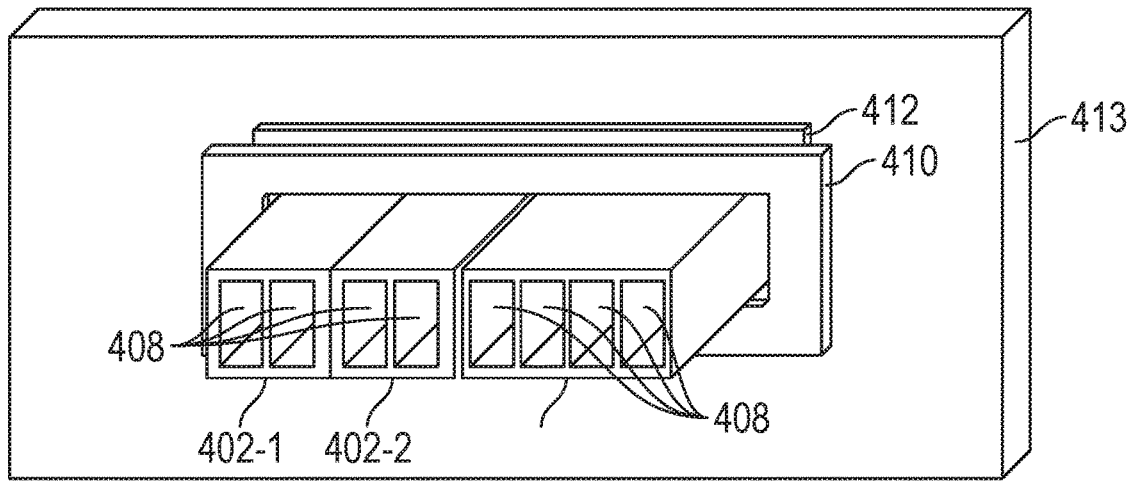
FIG. 4 is a front isometric view of a modular faceplate optical sub-assembly according to one example inserted into a faceplate.

In various examples, varying numbers of multi-bay optical housings having varying numbers of optical bays may be provided. In the example of FIG. 2, each of the two multi-bay optical housings 202 includes four front optical bays 208. On the other hand, FIG. 4 is a front isometric view of a modular faceplate optical sub-assembly 400 according to another example, inserted into a faceplate 413 of a compute module, in which a first multi-bay optical housing 402-1 and a second multi-bay optical housing 402-2 each have two front optical bays 408, and a third multi-bay optical housing 402-3 has four front optical bays 408. In this example, multi-bay optical housings 402-1, 402-2 and 402-3 are arranged in a horizontal row and are surrounded by a collar 410. A gasket 412 is disposed between collar 410 and faceplate 413.

Figure 5:
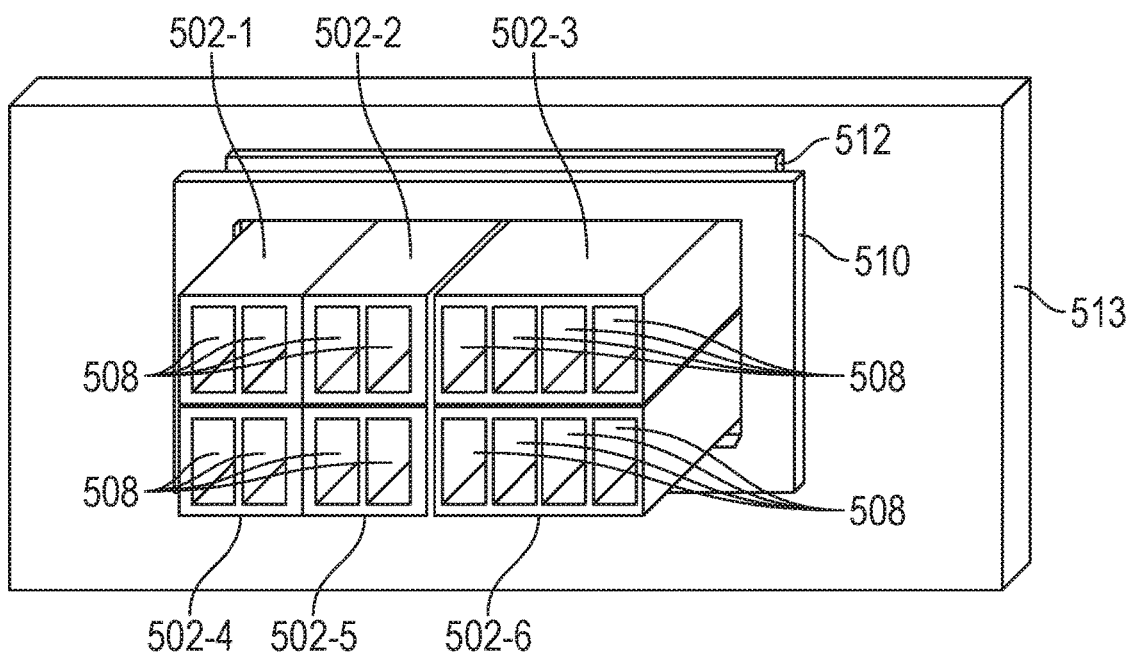
FIG. 5 is a front isometric view of a modular faceplate optical sub-assembly according to one example inserted into a faceplate.

FIG. 5 shows a front isometric view of a modular faceplate optical sub-assembly 500 according to another example. The faceplate optical sub-assembly 500 is shown inserted into a faceplate 513 of a compute module not otherwise shown, in which a first multi-bay optical housing 502-1 and a second multi-bay optical housing 502-2 each have two front optical bays 508, and a third multi-bay optical housing 502-3 has four optical bays 508. Multi-bay optical housings 502-1, 502-2, and 502-3 are arranged in first a horizontal row. Further, in this example, multi-bay optical housings are arranged in a stacked configuration, such that a fourth multi-bay optical housing 502-4, with two front optical bays 508, a fifth multi-bay optical housing 502-5, with two connector bays, and a sixth multi-bay optical housing 502-6, with four connector bays, are arranged in a second horizontal row and are disposed beneath the first row of multi-bay optical housings 502-1, 502-2, and 502-3. The size and shape of collar 510 and gasket 512 are changed relative to those of the size and shape of collar 410 and gasket 412 from the example of FIG. 4 in order to accommodate the stacked arrangement of multi-bay optical housings in the example of FIG. 5.

Figures 6A, 6B, 7A, 7B:
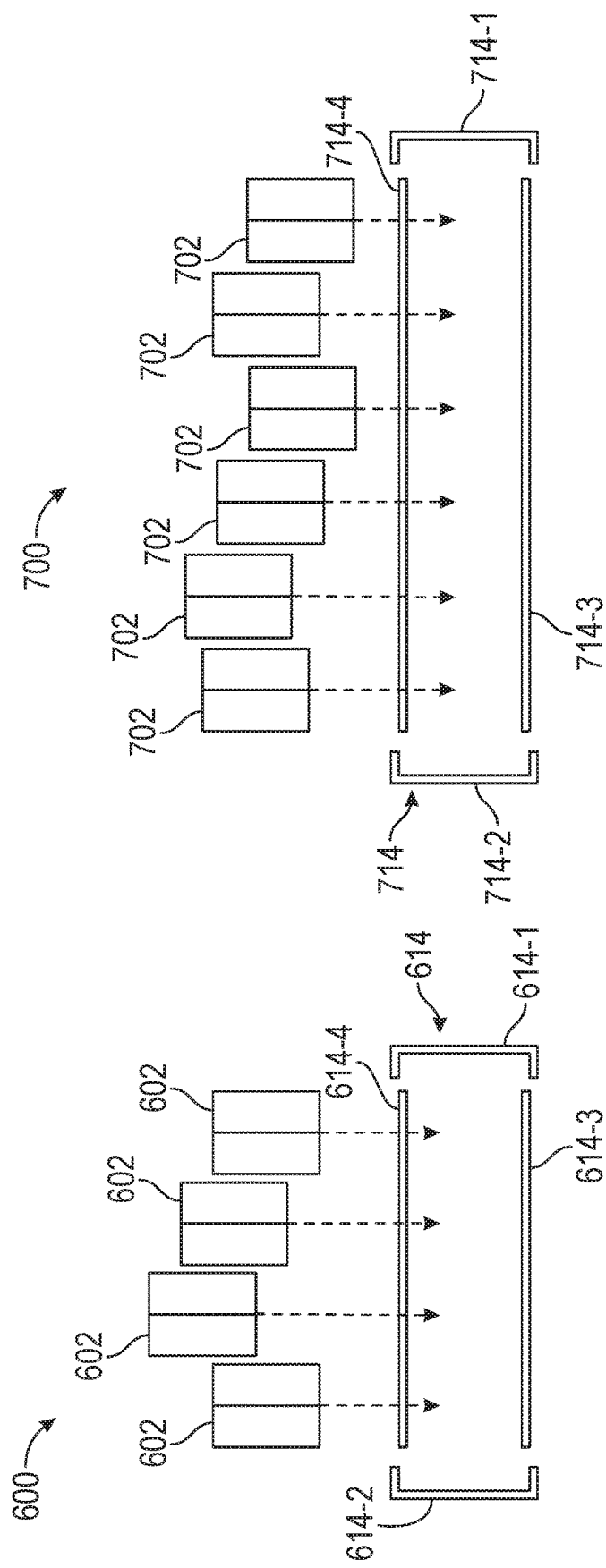
FIG. 6A is a partially exploded front view of interlocking sub-shells and optical receptacles for a modular faceplate optical sub-assembly according to one example.
FIG. 6B is a front view of the interlocking sub-shells and optical receptacles from FIG. 6A.
FIG. 7A is a is partially exploded front view of interlocking sub-shells and optical receptacles for a modular faceplate optical sub-assembly according to one example.
FIG. 7B is a front view of the interlocking sub-shells and optical receptacles from FIG. 7A.

FIG. 6A is a partially exploded front view of interlocking sub-shells and optical receptacles for a modular faceplate optical sub-assembly 600 according to another example. In this example, a shell structure 614 includes side sub-shells 614-1 and 614-2 a lower sub-shell 614-3 and an upper sub-shell 614-4. In some examples, some sub-shells and/or components thereof may have indicia (such as with labels, embossing, engraving) identifying them relative to one another (e.g., upper versus lower), their respective connector orientations for correct polarity, their model/serial numbers, the identity of the manufacturer, and so on. A plurality of multi-bay optical housings (in this example, four multi-bay optical housings 602) are secured within shell 614. FIG. 6B shows the example of FIG. 6A in an assembled state. Side sub-shells 614-2 and 614-2, upper sub-shell 614-3 and lower subshell 614-3 may be interlocked to form a unitary shell structure. In one example, each 2-bay pair of multi-bay optical housing 602 of optical sub-assembly 600 may be used for two independent optical plug connectors (not shown) of an optical cable. In another example, each 2-bay pair of the same multi-bay optical housing 602 of optical sub-assembly 600 may be used for one ganged 4-fiber optical plug connectors (not shown) of an optical cable. The separation of the adjacent 2-bay pair allows ease of use, e.g., to easily identify which adjacent bay pairs are to be used to install an optical cable with ganged optical plug connectors. Similarly, other than 2-bay pair receptacles may be implemented accordingly to support bifurcatable optical cables, e.g., one 4-bay, two 2-bay, or four 1-bay plug connectors on the same optical receptacle housing.

FIG. 7A is a partially exploded front view of interlocking sub-shells and optical receptacles for a modular faceplate optical sub-assembly 700 according to another example having six multi-bay optical housings 702 rather than the four multi-bay optical housings 602 in the example of FIGS. 6A and 6B. In this example, a shell 714 includes side sub-shells 714-1 and 714-2 a lower sub-shell 714-3 and an upper sub-shell 714-4. A plurality of multi-bay optical housings (in this case, six multi-bay optical housings 702) are secured within shell 714. FIG. 7B shows the example of FIG. 7A in an assembled state.

Figure 8A:
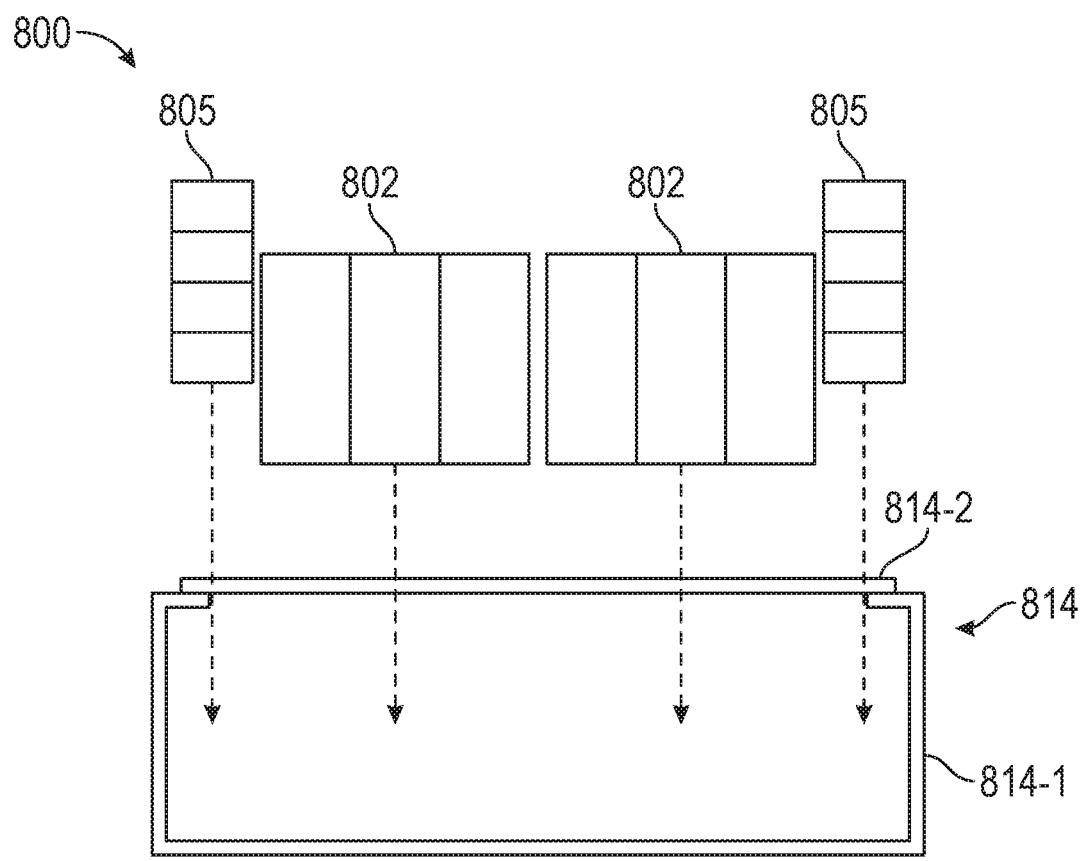
FIG. 8A is a is partially exploded front view of interlocking sub-shells and optical receptacles for a module faceplate optical sub-assembly according to one example.
Figure 8B:
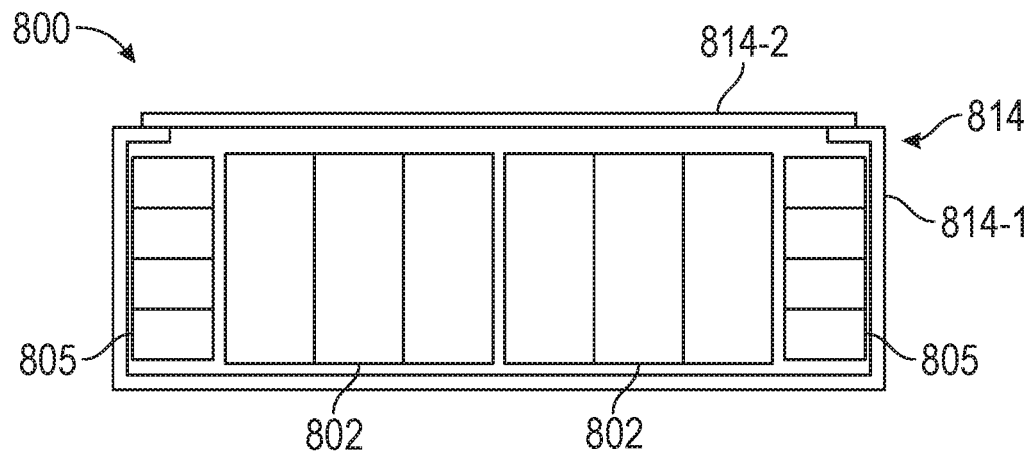
FIG. 8B is a front view of the interlocking sub-shells and optical receptacles from FIG. 8A.

FIG. 8A is a partially exploded front view of interlocking sub-shells and optical receptacles for a modular faceplate optical sub-assembly 800 according to another example. In this example, a shell structure 814 includes an integrated lower and side sub-shell 814-1 and an upper sub-shell 814-2. Integrated lower and side sub-shell 814-1 and upper sub-shell 814-2 interlock to form a unitary shell structure 814. A plurality of multi-bay optical housings (in this example, two multi-bay optical housings 802) are secured within shell 814. In addition, in this example, a plurality of air-vent housings 805 are secured within housing 814 alongside multi-bay optical housings 802 to provide for airflow through the modular faceplate optical subassembly. FIG. 8B shows the example of FIG. 8A in an assembled state. Fewer or more air-vent housings 805 may be used, and may be positioned differently than shown in FIG. 8A, e.g., one additional air-vent housing 805 between the two multi-bay optical housings 802, only one air-vent housing 805 between the two multi-bay optical housings 802, depending on the air flow needs of a compute module.

Figure 9F:
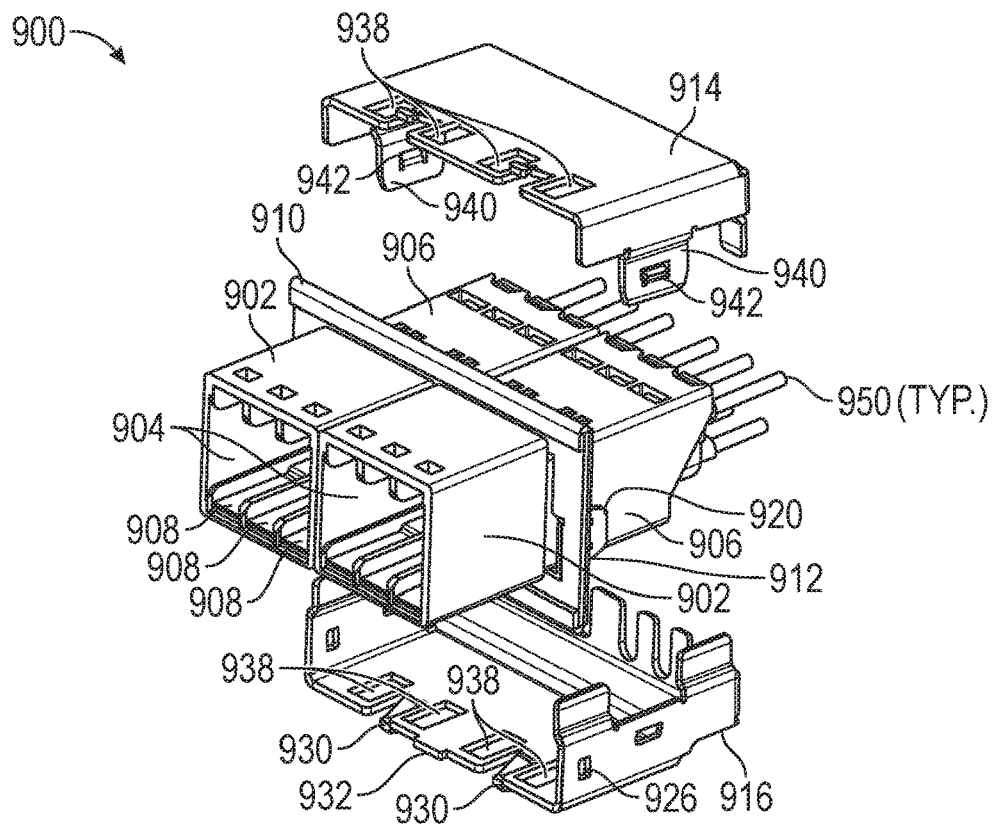
FIGS. 9A through 9P are isometric views showing a sequence of assembly of a modular faceplate optical sub-assembly according to one example.
Figure 9G:
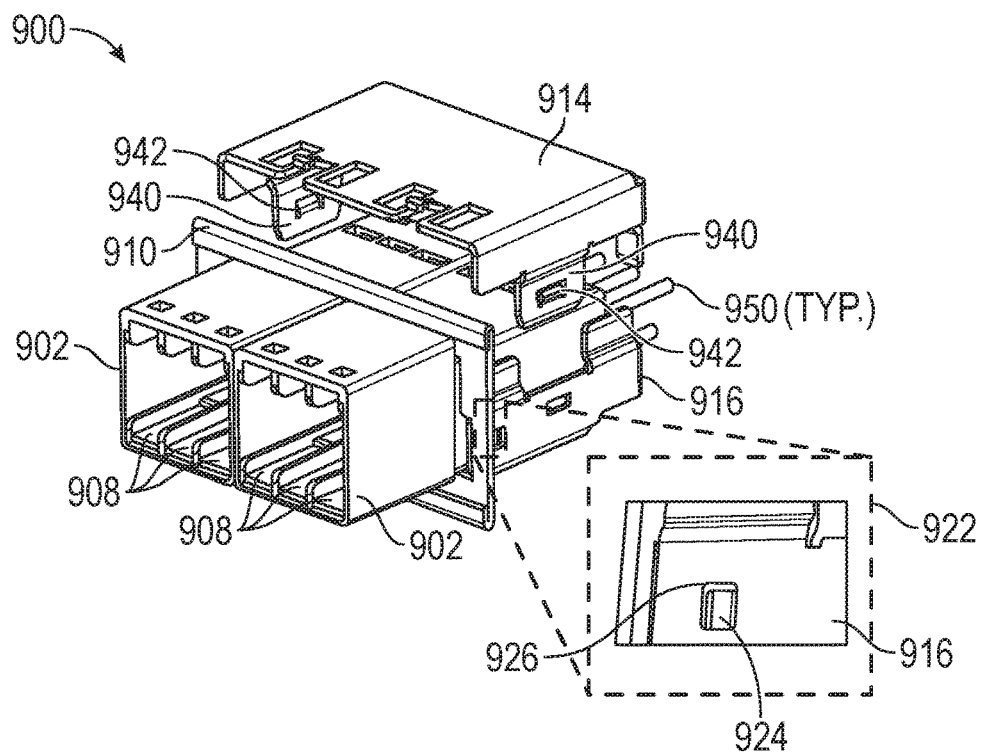
Figure 9H:
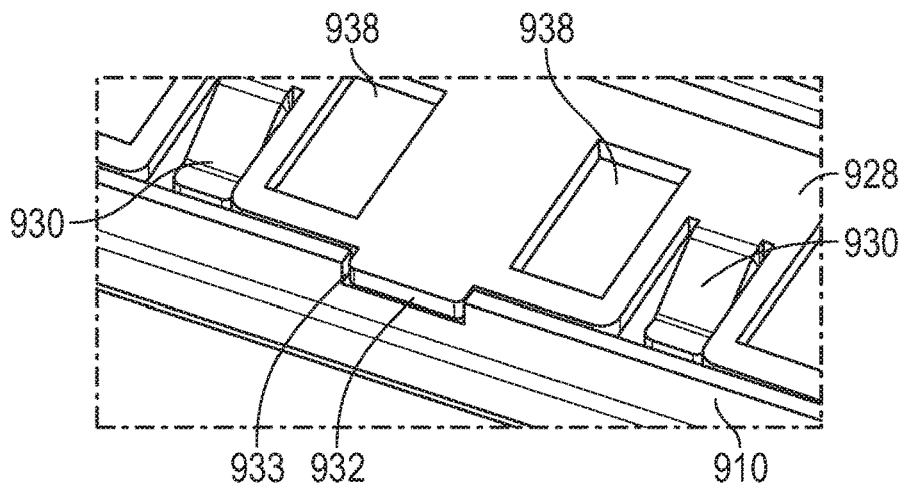
Figure 9I:
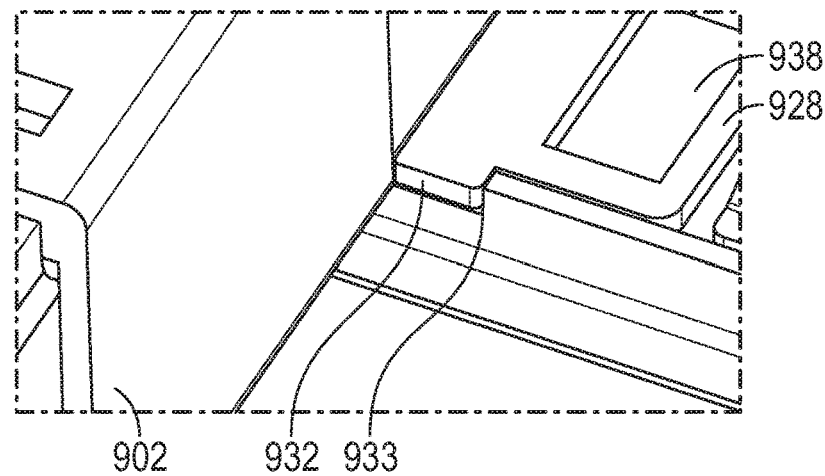
Figure 9J:
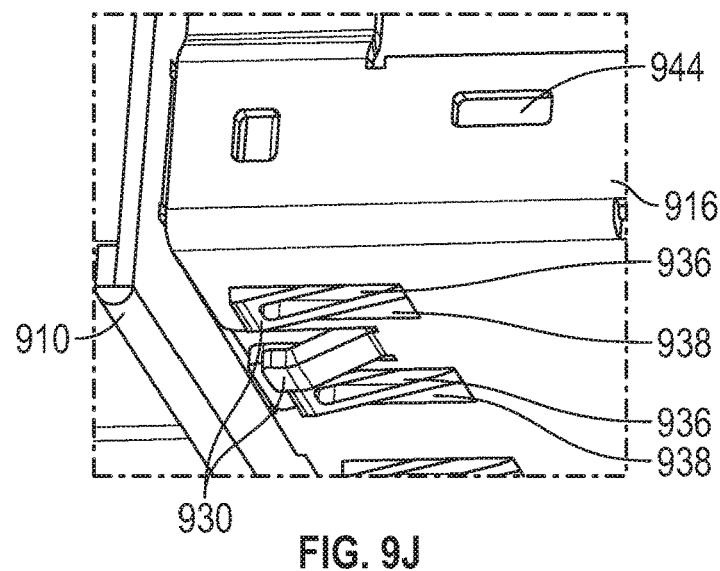
Figure 9O:
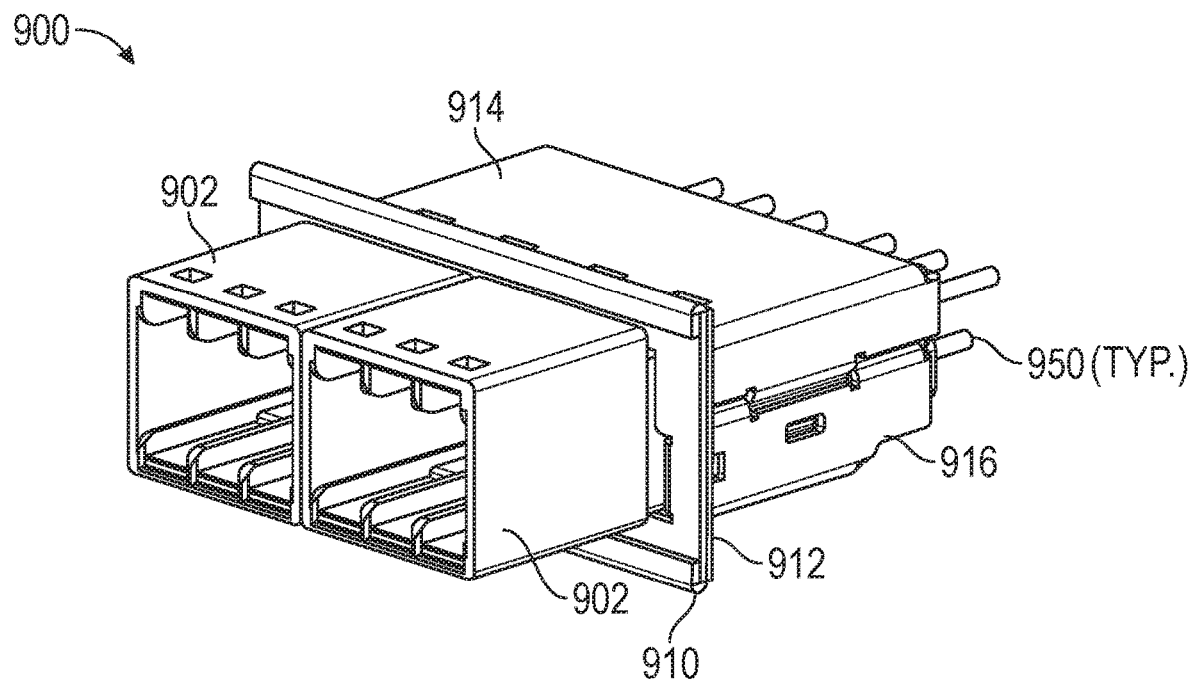
Figure 9P:
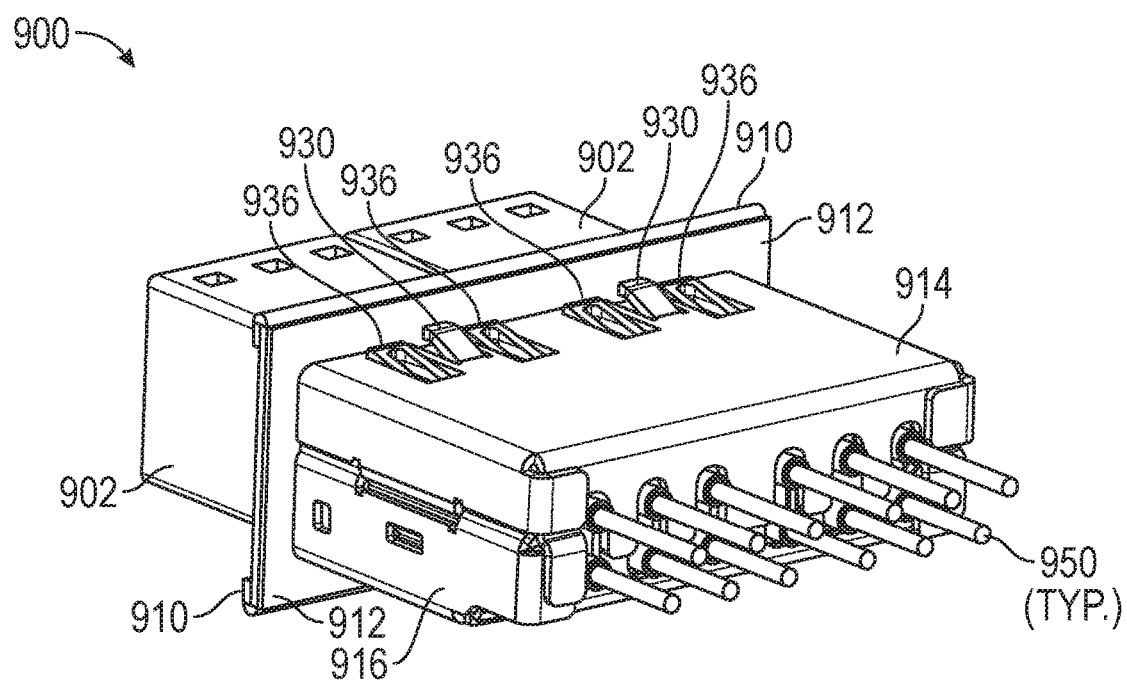

FIGS. 9A through 9P illustrate a method of assembly of a modular faceplate optical sub-assembly 900 according to another example. FIG. 9A shows a pair of multi-bay optical housings 902 being arranged side-by-side prior to insertion into a collar 910. Each multi-bay optical housing 902 comprises a front multi-bay optical connector receptacle 904 and a rear multi-bay optical receptacle 906. FIG. 9B shows multi-bay optical housings 902 arranged side-by-side, and FIG. 9C shows multi-bay optical housings 902 having been inserted into and surrounded by collar 910, with rear multi-bay optical receptacle 906 of multi-bay optical housings extending behind collar 910.

FIG. 9D is a rear isometric view of the assembly of modular faceplate optical sub-assembly 900 after insertion of multi-bay optical housings 902 through collar 910 and installation of a gasket 912 behind collar 910, such that collar 910 and gasket 912 surround multi-bay optical housings 902. Also shown in FIG. 9D is a plurality of optical fiber jumper connectors 934 being inserted into rear optical bays in rear multi-bay optical connector receptacles 906 of multi-bay optical housings 902. FIG. 9E shows optical fiber jumper connectors 934 inserted into rear optical connector receptacles 906 of multi-bay optical housings 902

FIG. 9F is an exploded front isometric view of modular faceplate optical sub-assembly 900 which includes a plurality of multi-bay optical housings 902 each having a front multi-bay optical connector receptacle 904 and a rear optical connector receptacle 906. In this example, each front multi-bay optical connector receptacle 904 includes a plurality of optical connector bays 908, which may be, for example, duplex connector bays for receiving duplex connectors.

The plurality of multi-bay optical housings 902 may be inserted into and surrounded by a collar 910. Behind collar 910 may be a gasket 912, which in some examples may be made of conductive fabric over foam to provide shielding of electromagnetic interference/radio frequency interference (EMI/RFI).

In the example of FIGS. 9A-9P, modular faceplate optical sub-assembly 900 further includes a shell structure for further retaining the plurality of multi-bay optical housings 902. As shown in FIG. 9F, assembly 900 includes an upper sub-shell 914 and a lower sub-shell 916. In this example, and as herein after described in further detail, upper sub-shell 914 and lower sub-shell 916 may be interlocking and secured around rear optical receptables 906 of multi-bay optical housings 902. A tab 920 extends rearwardly from collar 910. As hereinafter described and shown, tab 920 includes a deflecting detent (not shown in FIG. 9F) for engaging with lower sub-shell 916.

In particular, as shown in detail 922 of FIG. 9G, a deflecting detent 924 included on tab 920 of collar 910 engages with an aperture 926 in lower sub-shell 916 (also shown in FIG. 9F) to secure lower sub-shell 916 to collar 910. The engagement of deflecting detent 924 with aperture 926 further serves to compress lower sub-shell 916 against gasket 912 and collar 910, thereby enhancing rigidity of the engagement of multi-bay optical housings 902 with collar 910, preventing wiggles when optical cable connectors are installed in or removed from optical bays 908. In addition, tabs 920 are conductively coupled to aperture 926 to enhance ground contacts for EMI/RFI current flow.

FIG. 9H is a detailed isometric view of the bottom portion 928 of lower sub-shell 916 in this example. As shown in FIG. 9H, lower sub-shell 916 includes a pair of deflecting detents 930 which deflect to engage behind collar 910 and gasket 912 after lower sub-shell 916 is installed and locked into collar 910. In this example, lower sub-shell 916 is installed and locked into collar 910 before upper sub-shell 914 is installed onto lower sub-shell. An alignment feature 932 may be provided to align with a notch 933 in collar 916. FIG. 9I shows the detailed isometric view of FIG. 9H with multi-bay optical housing 902 engaged with lower sub-shell 916. FIG. 9J is a detailed isometric view of the underside of a portion of lower sub-shell 916 after engagement with multi-bay optical housings 902. As shown in FIG. 9J (as well as in FIGS. 9A, 9B, 9D, and 9E), multi-bay optical housings 902 include deflecting detents 936 on their upper and lower surfaces which engage with apertures 938 (also shown in FIGS. 9F, 9H and 9I) in upper sub-shell 914 and lower sub-shell 916 to securely engage upper sub-shell 914 and lower sub-shell 916 with multi-bay optical housings 902. The deflecting detents 936 securely captured in apertures 938 firmly retain multi-bay optical receptacle housings 902 within the upper sub-shell 914 and lower sub-shell 916 of a faceplate optical sub-assembly 900.

FIG. 9K is a partially-exploded rear isometric view of modular faceplate optical sub-assembly 900 showing the process of engagement of upper sub-shell 914 with lower sub-shell 916 following engagement of lower sub-shell 916 with collar 910 and multi-bay optical housings 902 as described. As shown in FIG. 9K (and also shown in FIGS. 9F and 9G), upper sub-shell 914 includes side tabs 940 including deflecting detents 942 for engagement with corresponding apertures 944 in lower sub-shell 916 as shown in FIG. 9N.

As also shown in FIG. 9K, and as shown in more detail in the side cross-sectional view of FIG. 9M, fingers 946 on upper sub-shell 914 and fingers 948 on lower sub-shell 916 are interposed between optical fiber cables 950 extending rearwardly from optical fiber jumper connectors 934 inserted into rear portions 906 of multi-bay optical housings 902. (For clarity in the figures, the reference numeral "950 (TYP.)" is used to designate one of the plurality of optical fiber cables 950 shown in a given view). Fingers 946 and 948 have tapered lead-in features 952 and 954, respectively to facilitate engagement of upper sub-shell 914 with lower sub-shell 916, and are interference-fitted to form overlapping conductive fingers to minimize EMI/RFI holes of the assembled shell structure comprising upper and lower sub-shells 914 and 916. Folded tabs 958 and 959 are also to provide overlapping conductive flaps to minimize EMI/RFI holes. Fingers 946 and 948 and folding tabs 958 and 959 are to minimize orifice sizes to in turn prevent EMI/RFI leakages, especially when sub-shell shapes are stamped and folded. In some examples, molded conductive sub-shells may be constructed using conductive materials, including metal, conductive plastic, etc., where folded tabs may not be needed. In some examples, gasket strips may sandwiched between conductive sub-shells. In some examples, conductive sub-shells may be mated with tongue-and-groove structures.

As shown in FIG. 9L (top view of FIG. 9K), optical fiber cables 950 extending from optical fiber jumper connectors 934 rest in slots defined between sets of overlapping conductive fingers 946 and 948 as shown in FIG. 9M. In some examples, each optical fiber cable 950 includes a rigid plastic boot 956 which is a strain relief for the optical fiber cable 950 on the optical plug connector 934, and to protect the passage of optical fiber cable 950 between two sets of overlapping fingers 946 and 948.

FIGS. 9O and 9P partially show the front and rear isometric views of an assembled faceplate optical sub-assembly 900.

Figure 10A:
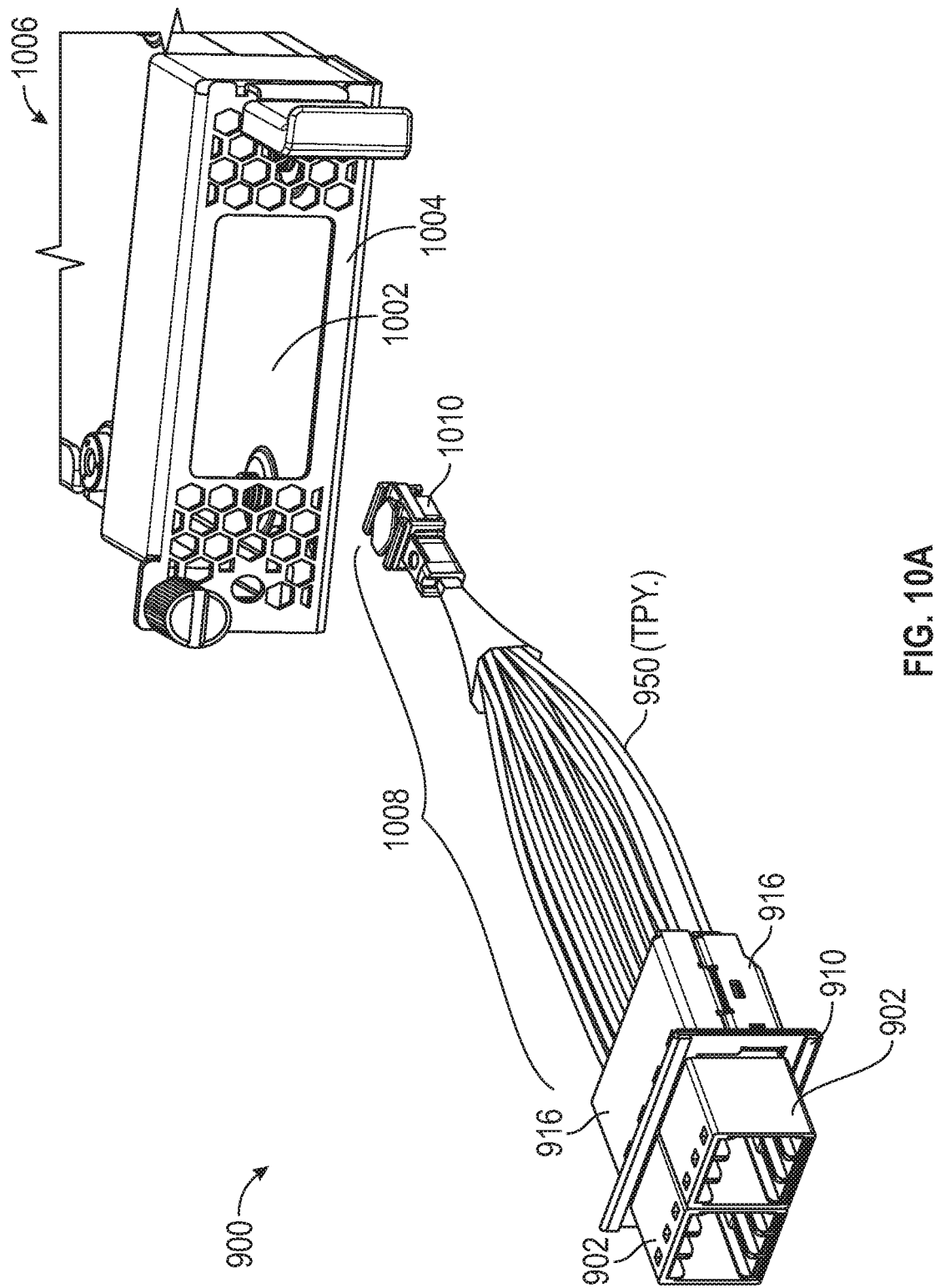
FIGS. 10A through 10D are isometric views showing installation of the modular faceplate optical sub-assembly of FIGS. 9A-9P in a compute module.

FIGS. 10A-10D are a sequence of isometric views showing installation of a modular faceplate optical sub-assembly 900 according to one example into an opening 1002 in a faceplate 1004 of a compute module 1006. As shown in FIG. 10A, optical fiber cables 950 are assembled as a fiber jumper assembly 1008 terminating at a chip ferrule 1010 for interfacing with circuitry, such as an application-specific integrated circuit ("ASIC") via an optical socket connector 1012 within compute module 1006.

In this example, optical fiber jumper connectors 934 may be inserted into the rear bays of multi-bay optical housings (see, e.g., FIGS. 9O and 9P) prior to installation of modular faceplate optical sub-assembly 900, prior to installation of a modular faceplate optical assembly 900 through opening 1002 of faceplate 1004. This allows complete assembly and functional/performance testing of modular faceplate optical sub-assemblies 900 in bulk quantity on an automated test bench for assembly yield and cost efficiency. Consequently, the need to insert optical fiber jumper connectors 934 into multi-bay optical housings after installation of modular faceplate optical sub-assembly 900 within the confines of compute module 1006, and potential low assembly yield problems are avoided.

When modular faceplate optical sub-assembly 900 is inserted into opening 1002 of faceplate 1004, deflecting detents 930 on upper sub-shell 914 and lower sub-shell 916 engage the rear surface of faceplate 1004 and serve to rigidly secure modular faceplate optical sub-assembly 900 within opening 1002. Gasket 912 is thereby compressed between collar 910 and the front surface of faceplate 1004.

Figure 10B:
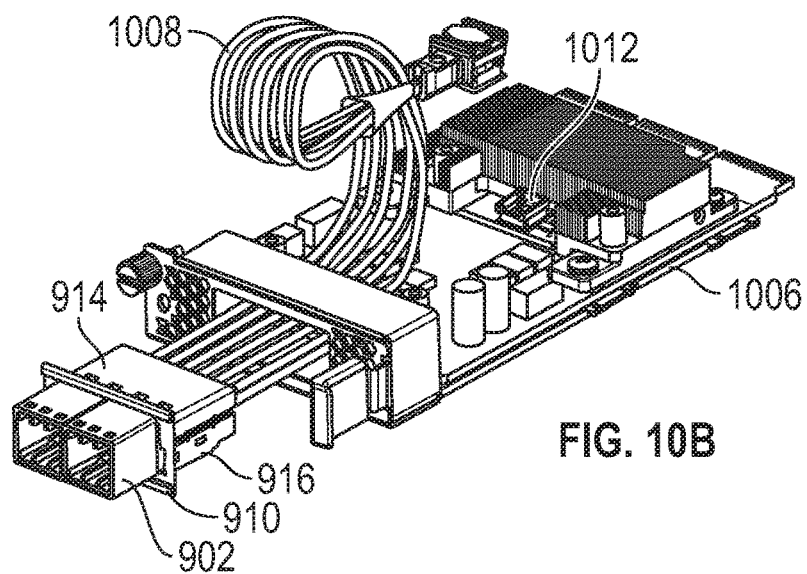
Figure 10C:
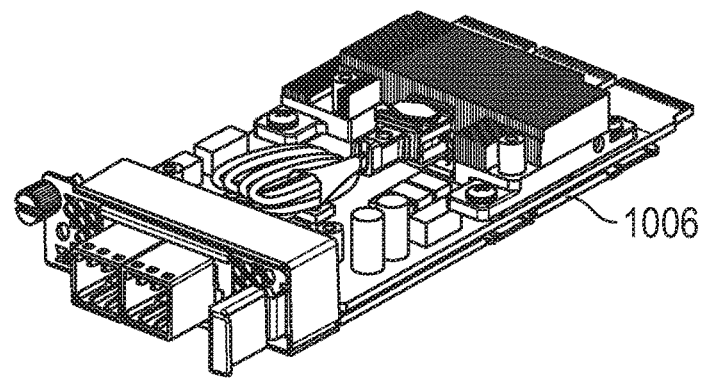
Figure 10D:
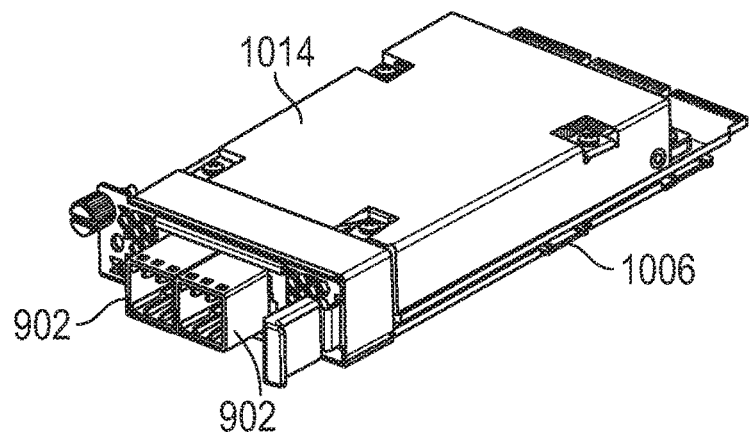

As shown in FIG. 10B, optical fiber cables 950 may be arranged or "dressed" such as by coiling in a desired configuration prior to insertion of chip ferrule 1010 into socket connector 1012 within compute module 1006. Fiber jumper assembly 1008 may need to have certain lengths for fibers to be easily terminated on chip ferrule 1010 as well as on fiber jumper connectors 934. Long enough lengths of optical fiber cables 950 may also be needed for rework in case fiber jumper assembly 1008 fails during functional/performance tests before the installation of fiber jumper assembly 1008. In some examples, fiber jumper assembly 1008 may be further dressed with tie wraps. FIG. 10C shows modular faceplate optical sub-assembly 900 fully inserted into opening 1002 and engaged with faceplate 1004, with optical fiber cables 950 dressed to fit within the dimensions of compute module 1006. As shown in FIG. 10D, a protective compute module housing 1014 may be installed to cover compute module 1006. Although not shown in FIG. 10B, optical fiber cables 950 of fiber jumper assembly 1008 may be wrapped with a conductive shield (not shown), e.g., graphene sheet, to provide further EMI/RFI shielding and mechanical containment.

Figure 11A:
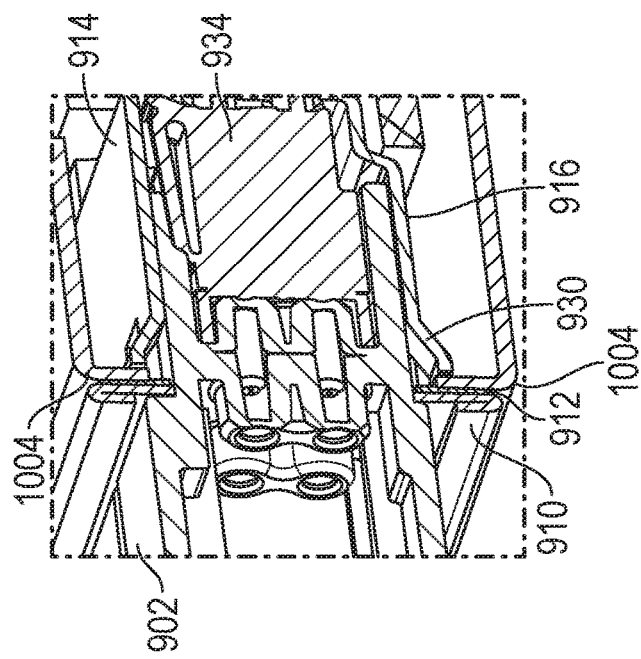
FIG. 11A is a side cross-sectional view of the modular faceplate optical sub-assembly of FIGS. 9A-9P.
Figure 11B:
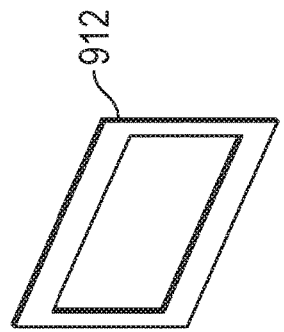
FIGS. 11B and 11C are partial isometric cross-sectional views of the modular faceplate optical sub-assembly of FIGS. 9A-9P.
Figure 11D:
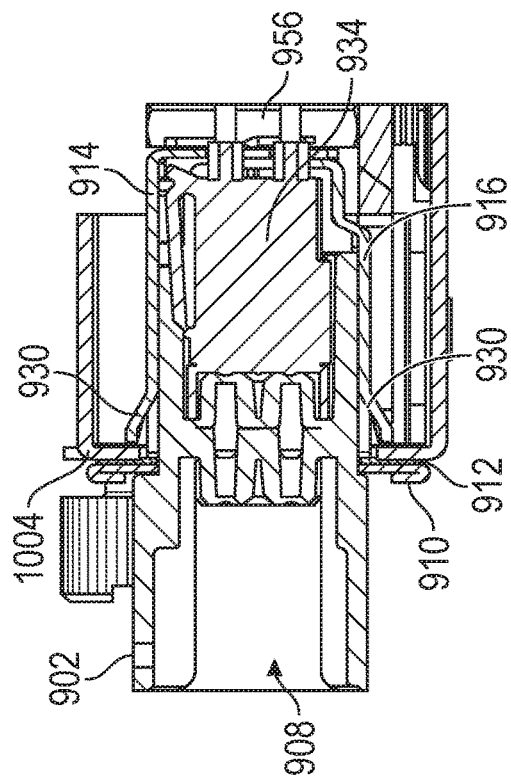
FIG. 11D is an isometric view of a gasket in the modular faceplate optical sub-assembly of FIGS. 9A-9P.
Figure 11C:
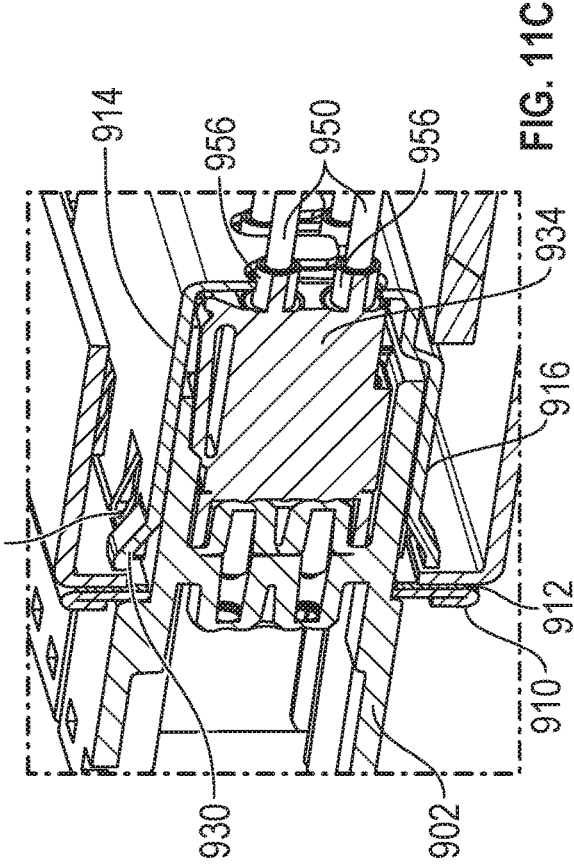

FIGS. 11A-11C are cross-sectional views of modular faceplate optical sub-assembly 900 after installation into compute module 1006 as described with reference to FIGS. 10A-10D. FIG. 11A is a side cross-sectional view which shows that deflecting detents 930 on upper sub-shell 914 and lower sub-shell 916 serve to engage the rear of faceplate 1004 to rigidly secure modular faceplate optical sub-assembly 900 within opening 1002 of faceplate 1004. This compresses gasket 912, shown in FIG. 11D, between collar 910 and the front of faceplate 1004.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:
1. A faceplate optical sub-assembly, comprising:
 a plurality of optical housings each comprising a rear portion, a front optical receptacle, and a rear optical receptacle, wherein the front optical receptacle of each optical housing includes a connector bay optically coupled to a connector bay of a rear optical receptacle;

a collar comprising an electromagnetic interference (EMI) shielding material encircling the plurality of optical housings;

a shell structure encasing the rear portions of the plurality of optical housings, the shell structure comprising an EMI shielding material and a pair of interlocking sub-shells to mechanically engage the collar; and a gasket comprising an EMI shielding material, disposed between the collar and the shell structure.

2. The faceplate optical sub-assembly of claim 1, wherein each front optical receptacle and each rear optical receptacle comprises a plurality of connector bays.

3. The faceplate optical sub-assembly of claim 1, wherein the plurality of optical housings are arranged in a horizontal row in the collar.

4. The faceplate optical sub-assembly of claim 1, further comprising an optical fiber jumper having a plurality of optical fibers having jumper connectors for insertion into the rear optical receptacles of the plurality of optical housings.

5. The faceplate optical sub-assembly of claim 4, wherein the pair of interlocking sub-shells include fingers interposed between the optical fibers of the optical fiber jumper.

6. The faceplate optical sub-assembly of claim 4, wherein the optical fibers terminate at a chip ferrule.

7. The faceplate optical sub-assembly of claim 1, wherein the collar includes a tab having a deflecting detent for engagement with an aperture in one of the pair of interlocking sub-shells.

8. A method of assembling a faceplate optical sub-assembly, comprising:

providing a plurality of optical housings, each comprising a rear portion, a front optical receptacle, and a rear optical receptacle, the front optical receptacle of each optical housing including a connector bay optically coupled to a connector bay of a rear optical receptacle of the optical housing;

encircling the horizontal row of the plurality of optical housings with a collar comprising an electromagnetic interference ("EMI") shielding material;

encasing the rear portions of the plurality of optical housings with a shell structure comprising an EMI shielding material, the shell structure comprising a pair of interlocking sub-shells to mechanically engage the collar; and disposing a gasket comprising an EMI shielding material between the collar and the shell structure.

9. The method of claim 8, wherein each optical receptacle includes a plurality of connector bays.

10. The method of claim 8, further comprising arranging the plurality of optical housings in a horizontal row in the collar.

11. The method of claim 8, further comprising inserting a plurality of optical fiber jumper connectors into the rear optical receptables of the plurality of optical housings.

12. The method of claim 11, further comprising interlocking fingers of the interlocking sub-shells between the optical fibers of the optical fiber jumper.

13. The faceplate optical sub-assembly of claim 11, wherein the optical fibers terminate at a chip ferrule.

14. The method of claim 8, further comprising engaging a deflecting detent on a tab extending from the collar with an aperture in one of the pair of interlocking sub-shells.

15. A method of installing a faceplate optical sub-assembly in a compute module, comprising:

providing a plurality of optical housings each comprising a rear portion, a front optical receptacle, and a rear optical receptacle, the front optical receptacle of each optical housing including a connector bay optically coupled to a connector bay of a rear optical receptacle of the optical housing;

encircling a horizontal row of the plurality of optical housings with a collar comprising an electromagnetic interference (EMI) shielding material;

encasing the rear portions of the plurality of optical housings with a shell structure comprising an EMI shielding material, the shell structure comprising a pair of interlocking sub-shells to mechanically engage the collar; and disposing a gasket comprising an EMI shielding material between the collar and the shell structure;

inserting a plurality of optical fiber jumper connectors of a plurality of optical fibers in a fiber jumper into the rear optical receptacles of the plurality of optical housings, each of the optical fibers in the fiber jumper terminating at a common chip ferrule;

inserting the fiber jumper with the plurality of optical fiber jumper connectors inserted into the rear optical receptacles of the plurality of optical housings through a faceplate opening in a faceplate of a compute module;

engaging the shell structure and the collar with the faceplate with the gasket disposed between the collar and the faceplate; and connecting the chip ferrule to an optical socket connector internal to the compute module.

16. The method of claim 15, further comprising arranging the plurality of optical housings in a horizontal row in the collar.

17. The method of claim 15, further comprising interlocking fingers of the interlocking sub-shells between the optical fibers of the optical fiber jumper.

18. The method of claim 15, further comprising engaging a deflecting detent on a tab extending from the collar with an aperture in one of the pair of interlocking sub-shells.

19. The method of claim 15, further comprising wrapping the optical fiber jumper with a conductive shield.

20. The method of claim 15, further comprising arranging the optical fibers within the confines of the compute module prior to connecting the chip ferrule to the optical socket connector.

* * * * *